Oct. 26, 1954    H. G. RICE    2,692,525
MACHINE FOR MAKING BUSHINGS FOR LIQUID CONTAINERS
Filed May 26, 1949    3 Sheets-Sheet 1

INVENTOR.
Harry G. Rice
BY
Barnes, Kisselle, Laughlin & Raisch
Attorneys.

Oct. 26, 1954  H. G. RICE  2,692,525
MACHINE FOR MAKING BUSHINGS FOR LIQUID CONTAINERS
Filed May 26, 1949  3 Sheets-Sheet 2
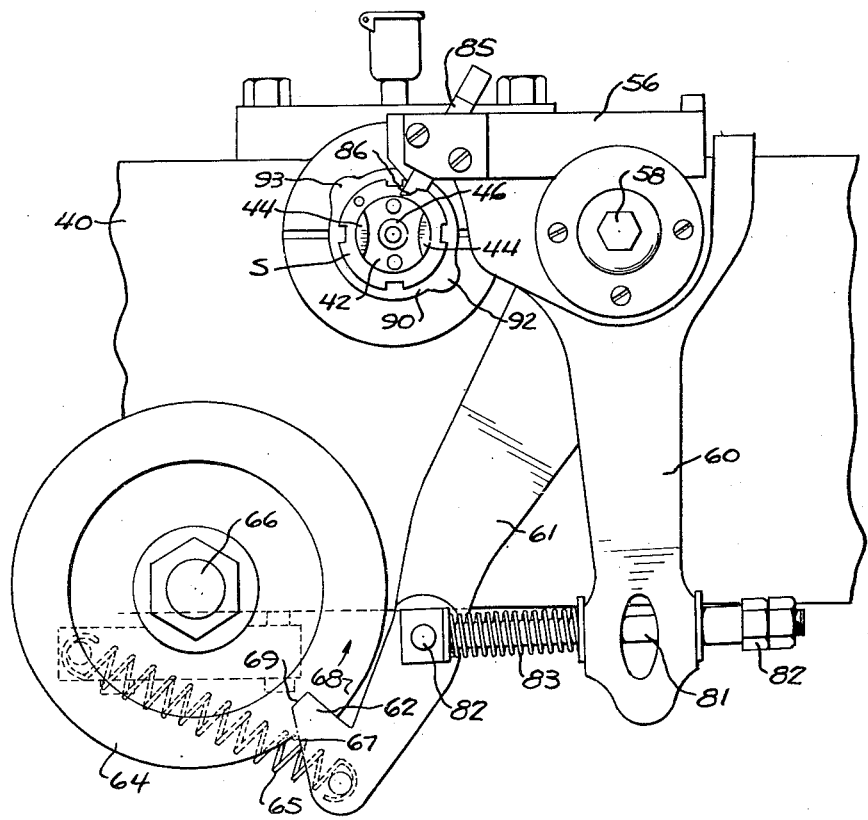
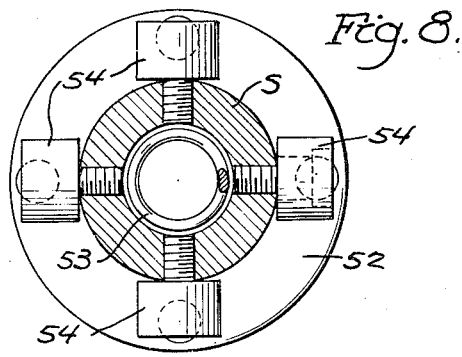
INVENTOR.
Harry G. Rice
BY
Barnes, Kisselle, Laughlin & Raisch
Attorneys Oct. 26, 1954    H. G. RICE    2,692,525
MACHINE FOR MAKING BUSHINGS FOR LIQUID CONTAINERS
Filed May 26, 1949    3 Sheets-Sheet 3
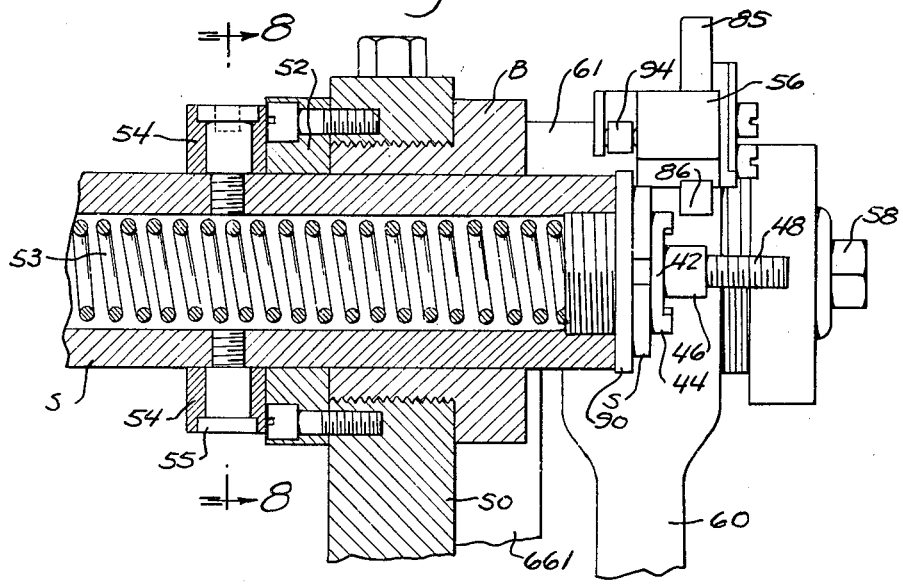
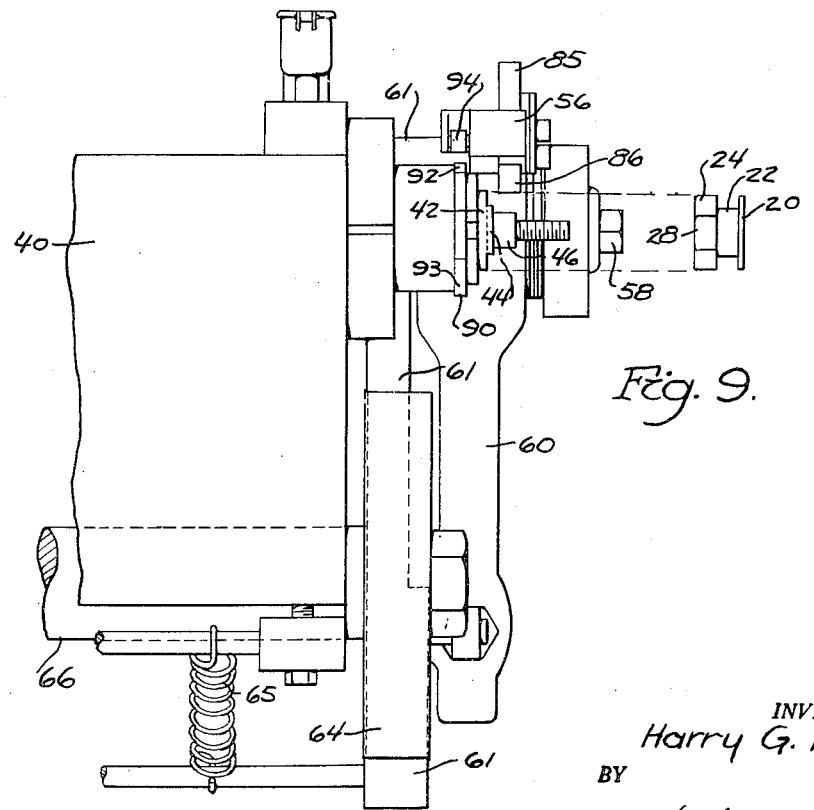
INVENTOR.
Harry G. Rice
BY
Barnes, Kisselle, Laughlin & Raisch
Attorneys.

Patented Oct. 26, 1954

2,692,525

UNITED STATES PATENT OFFICE 2,692,525

MACHINE FOR MAKING BUSHINGS FOR LIQUID CONTAINERS

Harry G. Rice, Detroit, Mich.

Application May 26, 1949, Serial No. 95,552

2 Claims. (Cl. 82—19)

1

This invention relates to a machine for making a metal bushing for a liquid container, such as a steel beer barrel or other similar unit.

Barrels of beer are delivered to bars and other commercial establishments for the dispensing of draft beer. The barrels must be provided with an opening for filling and also for the insertion of the beer tap tube, which has a bayonet slot connection with the opening in the barrel.

The present invention relates to a method and machine for making these bushings as a machined article. Previously they have been made as castings and forgings due to their peculiar shape, and it has been thought impossible to machine them in quantity.

I have developed a machine which will make these bushings out of stainless steel with sufficient accuracy that they need no finishing operation and providing a finished product which co-operates with the standard beer tap in the same manner as the old castings. Briefly, the invention consists in taking bar stock and, after drilling, turning it to provide the fastening flange, on the bushing, and the connecting flange. Slots are cut into the sides of the connecting flange, and then by a special machining process, the undercut portions of the slots are formed in the connecting flange.

Figure 1:
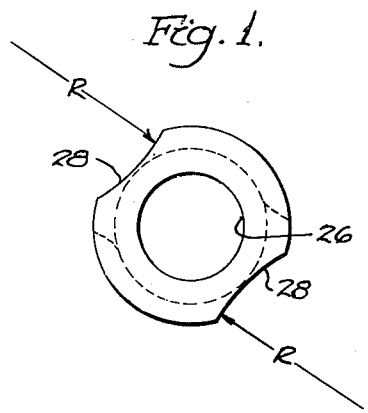
Figure 1 is an end elevation of the completed bushing.
Figure 2:
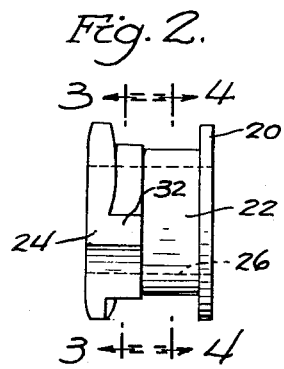
Figure 2 is a side elevation of the completed bushing.
Figure 3:
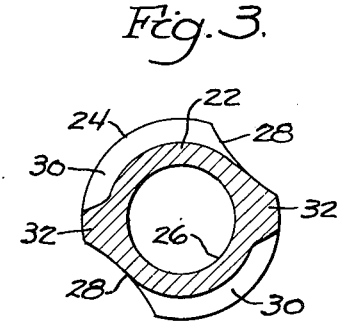
Figure 4:
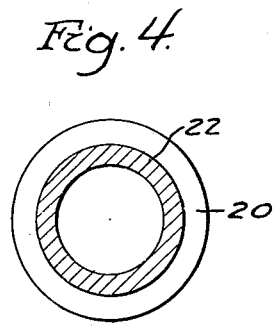

Figures 3 and 4 are sectional views on lines 3—3 and 4—4 of Figure 2.

Figure 5:
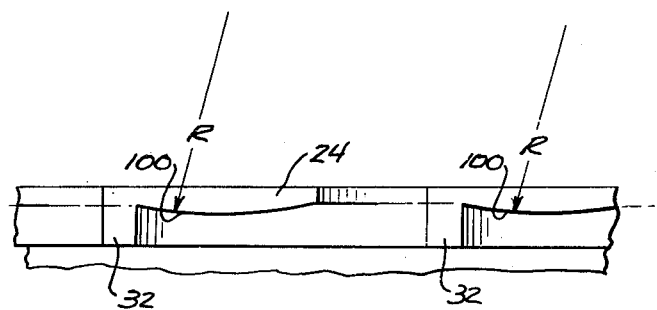

Figure 5 is a plan development of the connecting flange showing the relationship of the slots.

Figure 6 is an assembly view of the machine which cuts the undercut slots in the connecting flange.

Figure 7 is a sectional view of the machine showing the relationship of the parts.

Figure 8 is a view taken on line 8—8 of Figure 7.

Figure 9 is a view of the elements shown in Figure 6 taken from the side.

The blank of the beer tap bushing can be formed on a screw machine from round bar stock. The stock is milled on the outside to form a fastening flange 20, a body 22, and a connecting flange 24. An axial hole 26 is drilled through the body concentric with the flanges to form a cork hole to close the container. Upon the insertion of the beer tap tube, the cork is forced through the hole into the barrel and later washed out.

2

In the formation of the completed bushing, it is necessary to provide a bayonet slot on the connecting flange 24. The first step in the formation of this slot is the milling or grinding or sawing of two arc-like notches 28 in the connecting flange 24. These notches are cut into such depth that the deepest portion is substantially flush with the external diameter of the body 22. The next step in the operation is to form the undercut portions 30 adjacent each notch leaving the stops 32 adjacent each notch on the side opposite the undercut. This is done on a machine shown in Figures 6 to 9.

In Figure 6, a machine bed supports a spindle S on which is mounted a fixture 42, having projections 44 with an inside contour similar to the notches 28. The height of these projections 44 is approximately equal to the final flange 24. A partially formed bushing may be applied (Figure 9) to the fixture 42, the plug 46 on the end of the spindle being dimensioned to extend into the hole of the bushing. A threaded shaft 48 receives a nut (not shown) to hold the bushing in place during the final machining operation. As shown in Figure 7, the spindle S is rotatably mounted in a block B threaded into a plate 50. On the left side of the plate 50 is a cam plate 52 which will co-operate with cam rollers 54 affixed to the spindle S by set screws 55 to cause an axial displacement of the spindle and the work carried by the spindle. A spring 53 urges the spindle to the right as shown in Figure 7.

A main tool block 56 is pivotally mounted on a stud 58 which extends into the machine bed 40 parallel to and spaced from the spindle mount B. The main tool block is pivotally mounted on this stud and has an arm 60 depending therefrom. Resiliently connected to arm 60 and also pivoted on stud 58 is a leg 61 with a dog 62 formed at the end thereof to serve as a cam follower and latch in co-operation with a cam wheel 64. A spring 65 urges the dog 62 against the cam 64 which is mounted on a shaft 66. It will be noted that the cam 64 has a gradually increasing radius from the point 67 to the point 68, and a notch 69 terminates the increase in radius. Cam 64 is driven with the spindle and serves to stop the machine at the end of the machining of each piece.

The connection between arm 60 and leg 61 consists of a shaft 81 pivoted at 82 to the leg 61 and passes through the end of arm 60 where it is held in place by nuts 32 threaded on the end of the shaft. A compression spring 83 interposed between leg 61 and arm 60 transmits motion from leg 61 to arm 60. The shaft 81 is slidable in the leg 80. A tool 85 having a cutting end 86 is mounted at the proper angle in the tool block 56 and positioned relative to the work block 42 as shown in Figure 6.

On the end of spindle S behind the work holder is a cam plate 90 which rotates with the spindle and which has two diametrically opposed, outwardly extending humps 92 and 93, see Figure 6. A roller 94 mounted on the block 56 is positioned to co-operate with the cam 90 when the parts are in cutting position. This roller has an axial length great enough to absorb the axial movement of the spindle due to cam 52.

In the operation when the work is positioned on the spindle around the plug 46 and located radially by projections 44, the machine may be started and the dog 62 will drop out of the notch 69 and start progressing along the cam formation of the wheel 64. The wheel 64 will cause a gradual feed of the tool block 56 through spring 83. This would be a gradual feed for the entire rotation of cam wheel 64 were it not for the roller 94 on secondary block 76 which co-operates with cam plate 90 and causes the tool to follow substantially the outline on cam 90. Due to the two humps 92 and 93, the tool will be retracted from the work at two points in the rotation. Apart from these two retractions, at 180 degrees apart there is a gradual feed of the tool from the tool block and caused by the rotation of cam wheel 64. The spring 83 permits the operation of the cam plate 90.

In addition to the in and out feed of the tool and the gradual overall feed, there is an axial relative movement between the tool and the work by reason of the movement of the work with the spindle S. The cam 52 is shaped so that in development it follows the dotted line shown in Figure 5 and the two radii shown also in Figure 5. Thus, an undercut portion 100 (Figure 5) is formed in the portions of the connecting flange which are left after the machining operation. The inner surface of each undercut portion is curved from a point at the notch and the stop to a high point between the two.

It will thus be seen that I have provided a novel method of forming a bushing and a novel machine for performing this method. In addition the resulting bushing when formed from stainless steel needs no additional finishing and is smooth and easy to clean.

What I claim is:

1. A machine for cutting a flanged bushing which comprises an axially shiftable, rotating, work holding spindle, a cam for shifting said spindle axially in a predetermined regularity, a tool mounted adjacent the work, means mounting said tool comprising a tool block and pivotally disposed for limited rotation about an axis spaced from the spindle axis, a feed cam, means resiliently connecting said tool block and feed cam to cause gradual feed movement of said tool toward the work, and cam means rotating with the spindle to interrupt the feed movement of said tool at diametrically opposed points in the travel of the spindle, and means on the tool block to contact and follow said last named cam, said means having an axial projection great enough to absorb the axial shifting of said spindle.

2. In an automatic or semi-automatic lathe of the type having a rotating work support mounted on said bed, a contour cam on said support, a tool holding cross-slide for automatic feed and contour control comprising a tool holder block pivoted on said bed adjacent the work support for progressive tool feed motion toward the work support, an arm extending from said block, a cam follower on said block to be actuated by said contour cam to shift said block away from the work support, a feed control comprising a leg member pivoted at one end on said bed extending approximately in the same direction as said arm, a driven feed wheel having a spiral periphery, means urging the distal end of said leg against the periphery of said feed wheel, spring means associating said arm and leg to transmit feed motion from said wheel to the tool block and to permit cam actuation of said block away from the work support, and means limiting the spread of said arm and leg to prevent overfeed of said block.

References Cited in the file of this patent

UNITED STATES PATENTS

| Number | Name | Date |
|---|---|---|
| 499,977 | Fellows | June 20, 1893 |
| 1,512,995 | Melling | Oct. 28, 1924 |
| 1,699,720 | Stone | Jan. 22, 1929 |
| 1,916,581 | O'Brien | July 4, 1933 |
| 2,048,031 | Rice | July 21, 1936 |
| 2,271,950 | Mullen | Feb. 3, 1942 |
| 2,325,792 | Morrow | Aug. 3, 1943 |
| 2,340,513 | Deuring | Feb. 1, 1944 |
| 2,369,043 | Halford et al. | Feb. 6, 1945 |
| 2,377,239 | Kasen | May 29, 1945 |
| 2,410,443 | Hoffer | Nov. 5, 1946 |

FOREIGN PATENTS

| Number | Country | Date |
|---|---|---|
| 214,955 | Switzerland | Aug. 16, 1941 |